Dec. 18, 1928.
F. A. NEMEC
1,695,776
ECCENTRIC YOKE
Filed Jan. 22, 1925
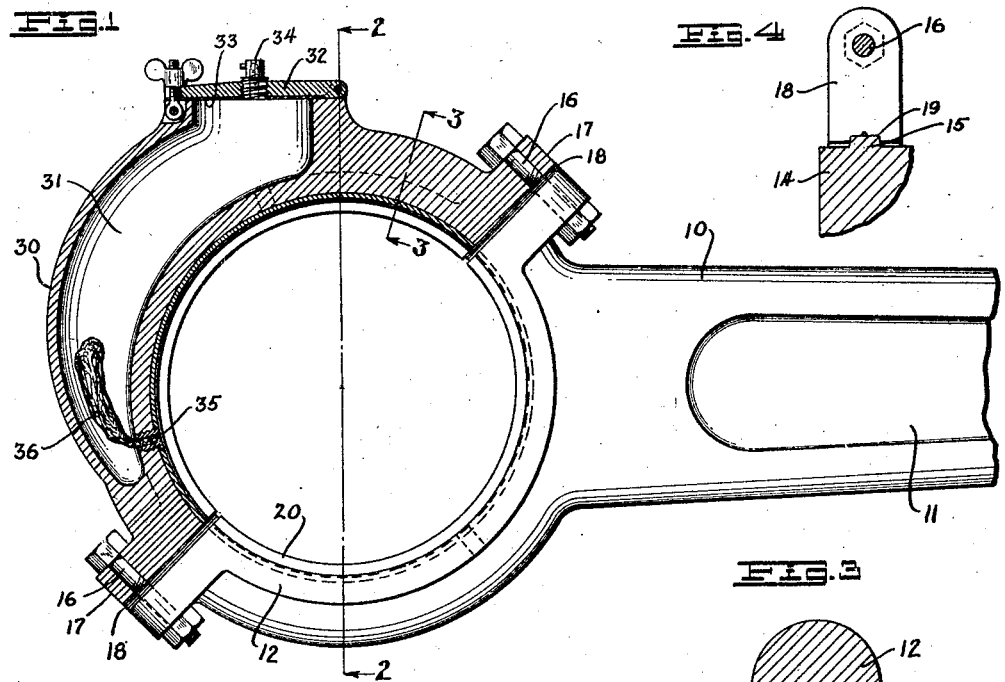
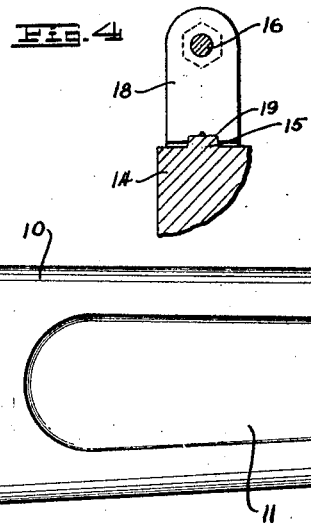
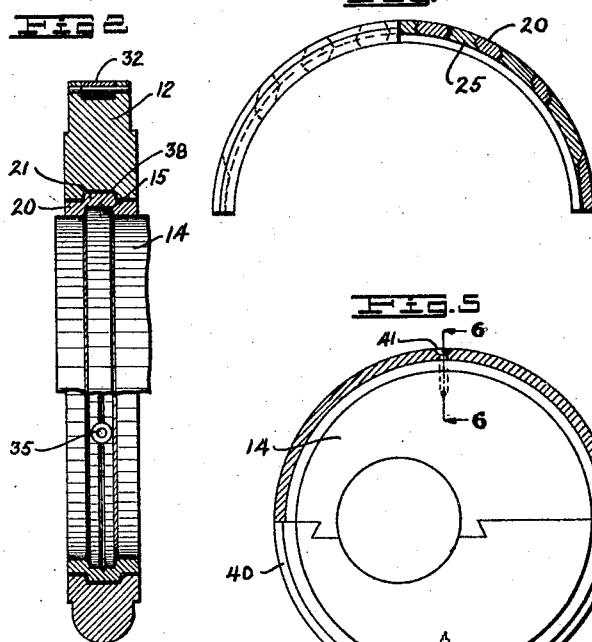
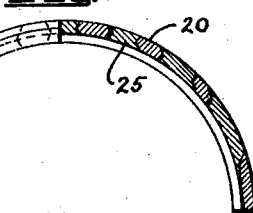
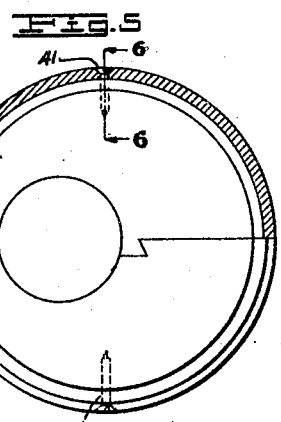
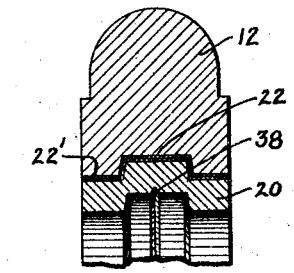
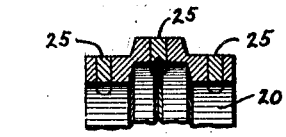
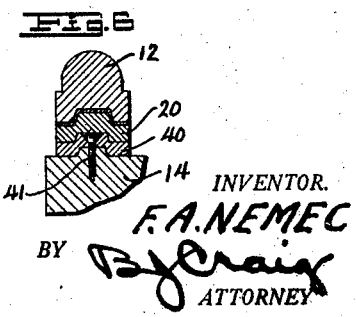
INVENTOR.
F. A. NEMEC
BY B. J. Craig
ATTORNEY Patented Dec. 18, 1928.

1,695,776

UNITED STATES PATENT OFFICE.

FRED A. NEMEC, OF BREA, CALIFORNIA.

ECCENTRIC YOKE.

Application filed January 22, 1925. Serial No. 4,021.

This invention relates to eccentric yokes which are adapted for use on rotary engines.

The general object of the invention is to provide an eccentric yoke which is highly efficient in use and which does not require frequent replacement.

One of the specific objects of the invention is to provide an improved bearing for an eccentric yoke wherein a removable bushing is arranged to be fitted on the yoke.

Another object of the invention is to provide an eccentric yoke with an improved means for lubricating the same.

Other objects of the invention will be apparent from the following description taken in connection with the accompanying drawings wherein Fig. 1 is an elevation partly in section showing my improved eccentric yoke; Fig. 2 is a section on line 2—2, Fig. 1; Fig. 3 is a section on line 3—3, Fig. 1; Fig. 4 is en enlarged detail showing a shim; Fig. 5 is a central sectional view partly in elevation showing another use of my invention; Fig. 6 is a section on line 6—6, Fig. 5; Fig. 7 is a sectional view partly in elevation showing the manner in which the anti-friction material is held in the bushing and Fig. 8 is an enlarged cross section of the modification shown in Fig. 7.

Referring to the drawing by reference characters, I have shown an eccentric yoke embodying the features of my invention at 10. This yoke comprises an arm portion 11 having a hub engaging portion 12. The hub or eccentric of the engine on which the yoke may be mounted is shown at 14. This hub is provided with a peripheral boss 15 as shown in Fig. 4.

The arm 11 and one portion 12 of the yoke are manufactured as an integral unitary structure. The other portion of the yoke may be made as a separate piece. The two portions of the yoke may be united by suitable fastening members such as bolts 16. Between the adjoining faces 17 of the two portions of the yoke I arrange shims 18. The shims are preferably notched as at 19 so that they will engage the boss 15. This construction provides a shim which will not move out of position while the device is being assembled or while being used.

Mounted within the yoke 12, I arrange a bushing 20. This bushing preferably corresponds in its internal periphery to the shape of the hub 14 while on its outer portion it is provided with an upstanding boss portion 21 which is less than one-half the width of the hub 12 and is received in a recessed portion 22 in the eccentric yoke.

The bushing 20 may be made of brass or other suitable material and it may be made solid or it may be provided with perforations 25 as shown in Fig. 7. These perforations preferably are of restricted diameter intermediate their ends and in each perforation I place suitable antifriction material such as babbitt. This material will be held in place by the restricted portions and will provide a good wearing surface.

With my bushing as described it will be apparent that when wear occurs the bushing may be removed and another inserted.

The wear on an eccentric yoke is quite rapid and for this reason my device has been found to possess great utility since heretofore when the eccentric became worn it was necessary to throw away the entire eccentric yoke.

In order to provide lubrication for the eccentric yoke, I provide a protuberance 30 on one side of the yoke as shown in Fig. 1. This protuberance is hollowed out to provide an oil cavity 31 which is adapted to be closed by a hinged closure 32. A suitable gasket 33 will afford an oil tight fit for the closure 32. If desired, a coupling 34 for a high pressure oil pump may be inserted in the closure 32.

I preferably arrange an aperture through the wall of the eccentric and through the bushing adjacent the lower portion of the oil chamber 31. In this aperture I arrange an oil pipe 35. A suitable wick 36 may be placed in the oil pipe to afford lubrication.

If desired, I may provide a V shaped oil groove 38 in the inner periphery of the bushing 20.

It is frequently desirable that bushings be arranged on the hub 14 as shown in Fig. 6. This bushing which is indicated at 40 may be held in place by means of fastening members 41. This bushing 40 is adapted to coact with the bushing 20 on an eccentric yoke 12 as previously described.

From the foregoing description it will be apparent that I have provided an improved eccentric yoke which is highly efficient in use and which eliminates excessive wear in the moving parts, while at the same time it allows quick and economical repair.

Having thus described my invention, 1 claim:

In a device of the class described, an eccentric having a peripheral boss thereon, an eccentric bushing on said eccentric, said bushing having an inner peripheral recess corresponding to and fitting over the boss on said eccentric, a peripheral boss on said eccentric bushing, said eccentric bushing comprising a plurality of curved pieces of metal provided with anti-friction means, a yoke fitted about said eccentric bushing, said yoke having an inner peripheral recess adapted to fit over said peripheral boss on said eccentric bushing, said yoke comprising two portions, means to fasten said portions together to form a complete eccentric strap, one of said strap portions having a protuberance thereon, an oil cavity in said protuberance, a second bushing in said yoke, said yoke and said last named bushing having aligned apertures, an oil pipe in said apertures, a wick in said pipe, and means to prevent relative rotation between said last named bushing and said yoke.

In testimony whereof, I hereunto affix my signature.

FRED A. NEMEC.